June 22, 1926.
J. W. KREBS
1,590,037
BUCKRAKE ATTACHMENT FOR TRACTORS
Filed Oct. 13, 1925   2 Sheets-Sheet 1
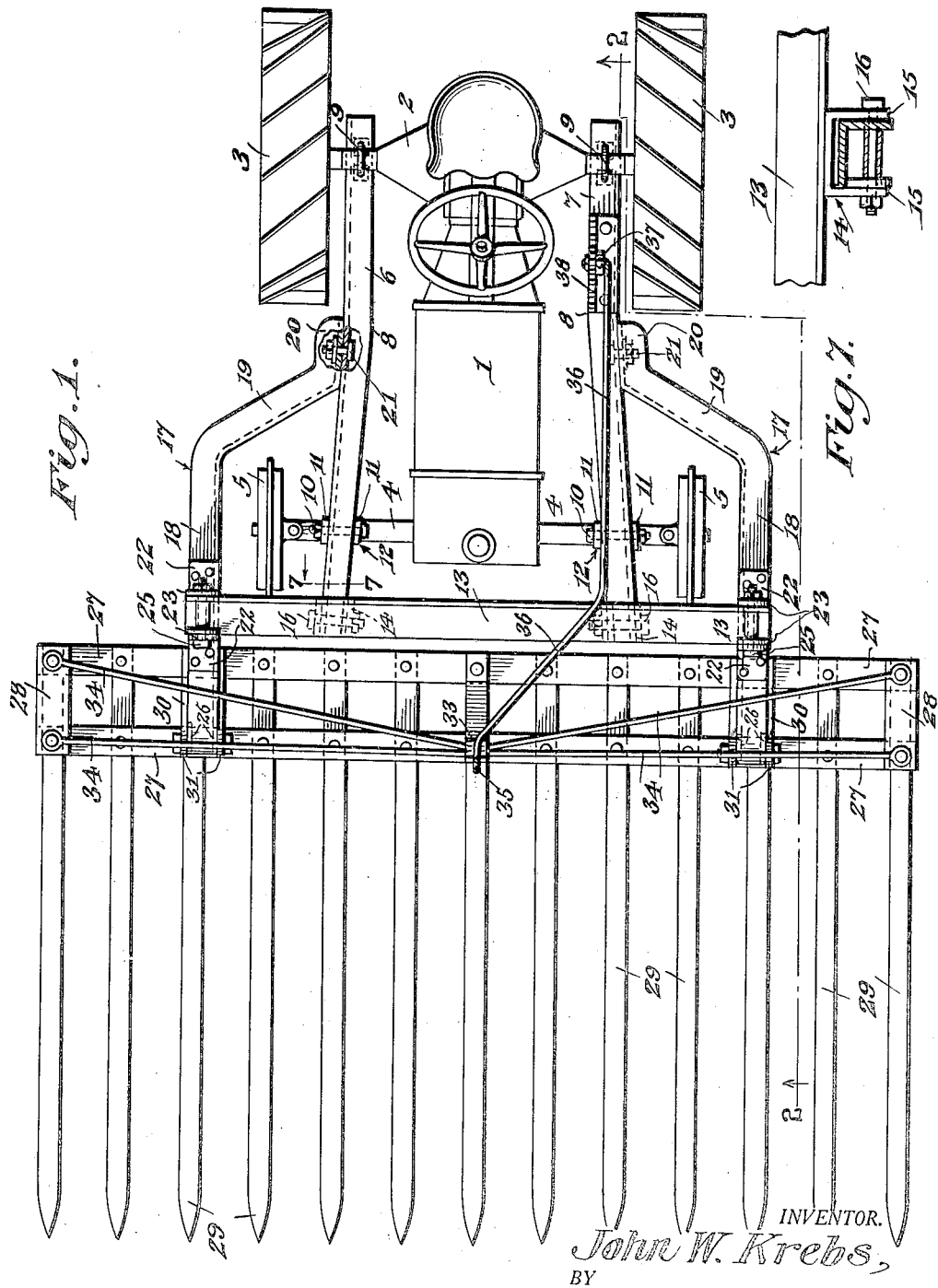
INVENTOR.
John W. Krebs,
BY
Geo. Kimmel. ATTORNEY.

June 22, 1926.
J. W. KREBS
1,590,037
BUCKRAKE ATTACHMENT FOR TRACTORS
Filed Oct. 13, 1925   2 Sheets-Sheet 2
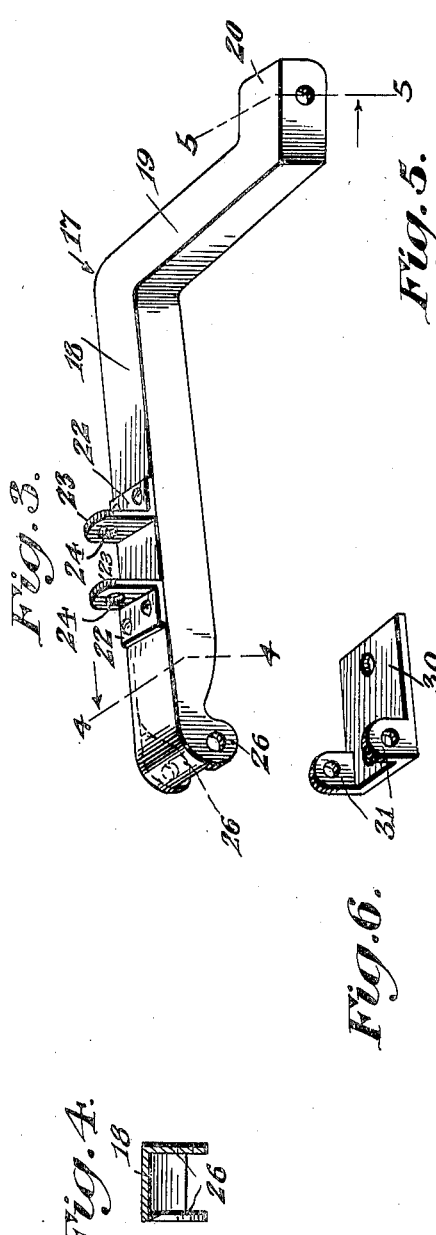
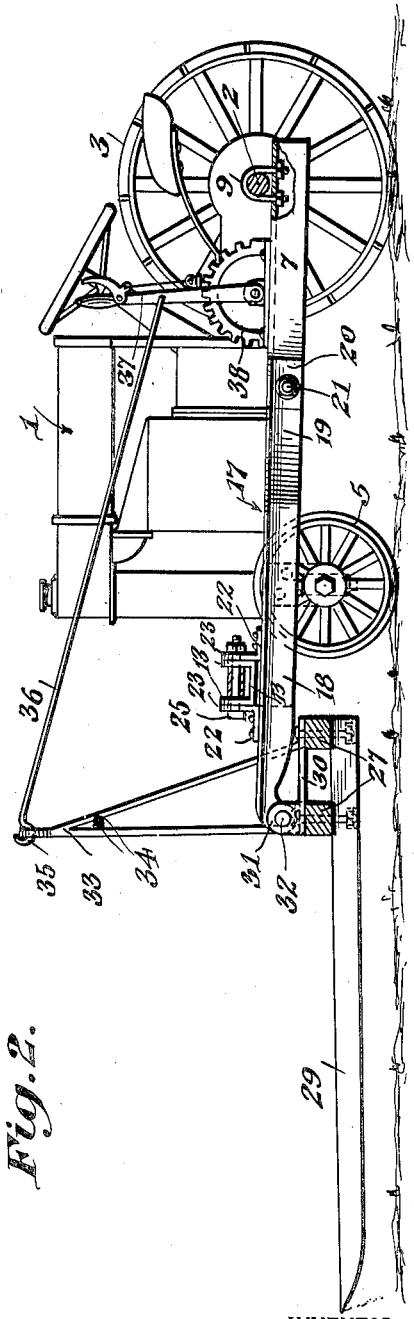
INVENTOR.
John W. Krebs,
BY
ATTORNEY.

Patented June 22, 1926.

1,590,037

UNITED STATES PATENT OFFICE.

JOHN W. KREBS, OF PHOENIX, ARIZONA.

BUCKRAKE ATTACHMENT FOR TRACTORS.

Application filed October 13, 1925. Serial No. 62,277.

This invention relates to harvesting and has for its primary object the provision, in a manner as hereinafter set forth, of an improved means for attaching a buckrake to a tractor.

The structure constituting this invention, by means of which a buckrake may be attached to and supported by a tractor, is designed primarily to enable a buckrake to be used upon uneven ground such as that encountered in sections of the country where irrigation ditches are extensively used.

One of the primary objects of this invention is the provision, in a manner as hereinafter set forth, of a means for setting up a flexible support for and connection between a buckrake and the power mechanism carrying the same, so that in passing over uneven land the connection between the rake and tractor will give thus preventing undue amount of strain upon the structure.

Another and final object of the invention is the provision, in a manner as hereinafter set forth, of means for supporting a buckrake upon a tractor, which will be of simple construction, strong and durable, and inexpensive to manufacture and set up.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 1 is a top plan view of a tractor showing the structure embodying this invention attached thereto and supporting a buckrake thereon.

Figure 2 is a longitudinal section taken upon the line 2—2 of Figure 1.

Figure 3 is a detailed perspective view of one portion or arm of the supporting structure.

Figure 4 is a transverse section of the supporting arm taken upon the line 4—4 of Figure 3.

Figure 5 is a section taken upon the line 5—5 of Figure 3.

Figure 6 is a detailed perspective view of a construction element employed in the structure and, Figure 7 is a section taken upon the line 7—7 of Figure 1.

Referring now to the drawings in detail wherein like numerals of reference indicate corresponding parts throughout the several views, there is shown a tractor indicated generally by the numeral 1, having the usual rear axle 2 upon which the rear traction wheels 3 are mounted and provided with a front axle 4 carrying the front wheels 5.

The structure embodying this invention comprises a pair of beams 6 and 7 respectively, the beam being bent intermediate their ends at the point 8 and mounted one on each side of the tractor body with the front portions thereof overlying the front axle 4 and with the rear portions extending beneath the rear axle 2. The rear portions of the beams are, as shown, in substantially parallel relation while the forward portions are in divergent relation and the rear end of the rear portion of each beam is provided with the U-bolt 9 which overlies the axle 2 and is secured to its respective beam to hold the same in position therebeneath.

The forward end of each beam is pivotally secured by means of the bolts 10 between the ears 11 of a cradle 12 mounted upon the axle 4.

Extending transversely of the tractor and overlying the forward ends of the beams 6 and 7 is a beam 13 which has secured to its underside a pair of inverted cradles 14, and between the ears 15 of each cradle the forward end of a beam is positioned and pivotally secured in position by means of the bolt 16. As shown the ends of the beam 13 extend a substantial distance beyond the front wheels 5 of the tractor. The purpose for this will be made clear in a following description.

Mounted upon the outer side of each of the beams 6 and 7, is a supporting arm indicated generally by the numeral 17. Each of these supporting arms comprise an outer, relatively long, forwardly extending portion 18 and an obtusely angled portion 19. The inner end of each of the portions 19 is bent to form an attaching base portion 20 which is substantially parallel with the portion 18 of the arm.

These base portions 20 are securely fastened to the outer side of the adjacent beams 6 and 7 by means of the bolt 21. It will be seen from this arrangement that the obtusely angled portion 19 of each arm positions the portion 18 laterally of the adjacent front wheel 5 and these portions 18 of the arms extend beneath the ends of the transverse beam 13.

At substantially the central portion of each of the arm portions 18 there is secured a spaced pair of angle members 22, the portions 23 of which are in opposed relation and are provided with apertures 24. Each end of the beam 13 is arranged between one of these spaced pairs of members 22 and is pivotally secured thereto by means of the bolt 25.

The outer or forward end of the portion 18 of each of the arms is provided with a pair of spaced downturned apertured ears 26 as shown in Figure 3.

Arranged forwardly of the tractor is a buckrake of the usual construction having a pair of spaced parallel beams 27 which are arranged parallel with the beam 13. These spaced beams 27 are connected by the end blocks 28 and have secured to the underside the forwardly extending tines 29. Overlying the beams 27 beneath the forwardly extended ends of the arm portions 18 are plates 30 which are bolted to the beams and which are each provided with spaced upstanding apertured ears 31. The ears 26 of the adjacent arms are arranged between the ears 31 of the plates 30 and pivot bolt 32 is passed through the aligned apertures of the ears, to pivotally connect the rake with the supporting frame carried by the tractor.

Mounted on a part of and over the beams 27 is a standard 33 to the upper portion of which is attached the ends of brace rods 34, the other ends of which rods are secured to the connecting block 28 at the outer sides of the rake.

The standard 33 is provided with an eye 35 and in this eye one end of an actuating bar 36 is connected which bar runs rearwardly to the lever 37 which is pivotally mounted upon the frame 7 and adjacent to and engageable with the notched sector 38.

From the foregoing description it will be readily seen that by the means herein described for supporting a buckrake from the front of the tractor, a steady and at the same time flexible support will be given to the rake enabling a load to be carried thereon with ease without danger of twisting or straining the frame while the machine is traveling over uneven ground, due to the pivoted connection between the parts employed.

Having thus described my invention what I claim is:—

1. In a buckrake support for use in connection with tractors, a pair of substantially parallel beams designed to extend longitudinally of a tractor and be supported by the axles thereof, an arm member upon the outside of each beam, each arm having an outer portion extending forwardly of the tractor and an angled inner portion secured at its end to the adjacent beam, a transverse beam overlying the extended ends of said pair of beams and of the outer portion of each arm, a pivotal connection between the transverse beam and the pair of beams and the pair of arms, a buckrake, and pivotal connection between said buckrake near the rear thereof and the forward end of the outer portions of said arms.

2. In a buckrake support for use in connection with tractor, a pair of substantially parallel beams designed to extend longitudinally of a tractor and be supported by the axles thereof, an arm member upon the outside of each beam, each arm having an outer portion extending forwardly of the tractor and an angled inner portion secured at its end to the adjacent beam, a transverse beam overlying the extended ends of said pair of beams and of the outer portion of each arm, a pivotal connection between the transverse beam and the pair of beams and the pair of arms, a buckrake, pivotal connection between said buckrake near the rear thereof and the forward ends of the outer portions of said arms, said pair of arms having a pair of spaced downturned ears upon the end of the outer portions, and a pair of plates secured to said rake at, and extending inwardly from, the rear edge thereof, each plate having a pair of upwardly extending apertured ears upon that end remote from the rear of the frame designed to be pivotally connected to those ears upon the adjacent end of said outer portion.

In testimony whereof, I affix my signature hereto.

JOHN W. KREBS.